Aug. 14, 1951

O. STEINER 2,564,453

MARKING APPARATUS FOR FILM IDENTIFICATIONS

Filed Aug. 16, 1950

INVENTOR.
OSCAR STEINER
BY
ATTORNEY

Aug. 14, 1951     O. STEINER     2,564,453
MARKING APPARATUS FOR FILM IDENTIFICATIONS
Filed Aug. 16, 1950     2 Sheets—Sheet 2
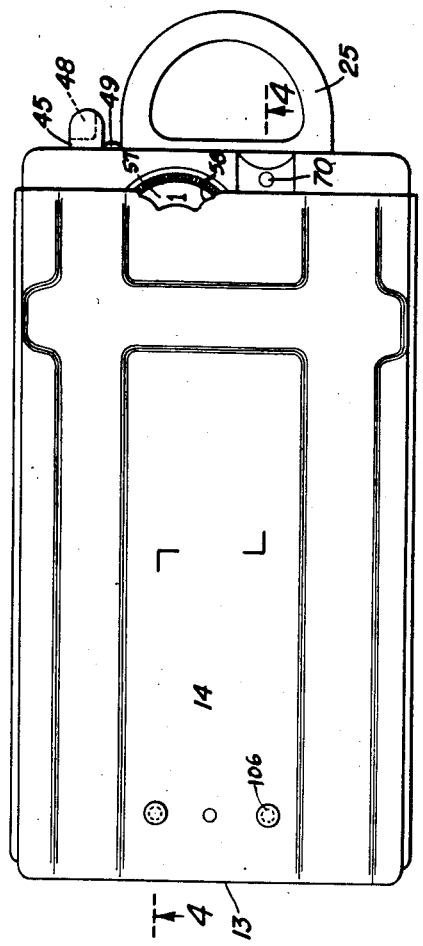
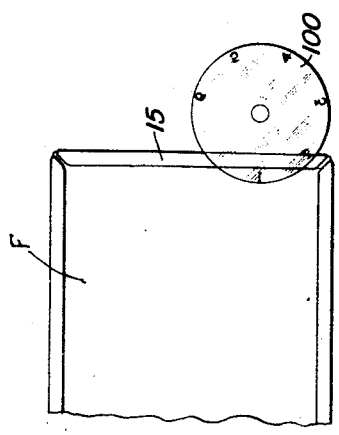
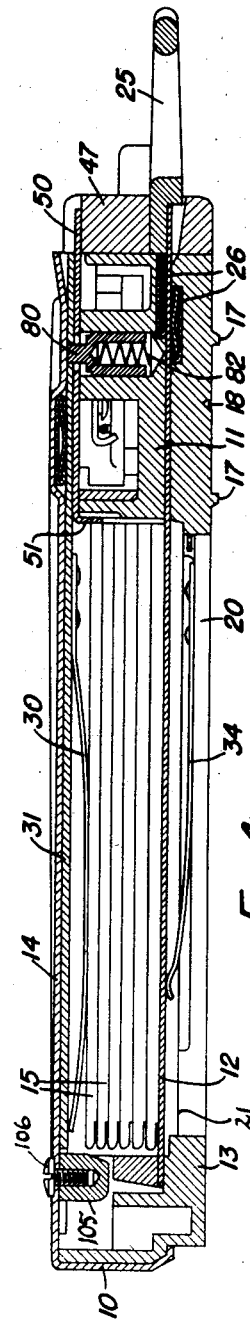
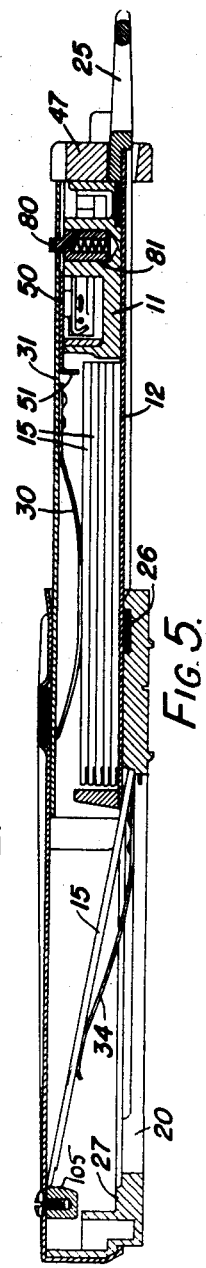
INVENTOR
OSCAR STEINER
BY
ATTORNEY Patented Aug. 14, 1951

2,564,453

UNITED STATES PATENT OFFICE 2,564,453

MARKING APPARATUS FOR FILM IDENTIFICATIONS

Oscar Steiner, Irondequoit, N. Y., assignor to Graflex, Inc., Rochester, N. Y., a corporation of Delaware Application August 16, 1950, Serial No. 179,749

15 Claims. (Cl. 95—1.1)

1

The present invention relates to film-identifying or marking apparatus for photographic cameras, and more particularly to a film-identifying or marking apparatus for a removable film magazine. In a still more specific aspect, the invention relates to an improvement on the film magazine of the pending U. S. patent application of John D. Wilson and Clarence E. Smith, Serial No. 115,646, filed September 14, 1949 and assigned to the assignee of the present invention.

When a photographer has taken a series of different pictures at different locations, or of different people, or of different groups of people, he frequently is unable to identify a particular scene, or a particular person, or group of persons, after the films have been developed. This is an experience often encountered by a news photographer who is constantly taking pictures of strangers and strange scenes.

Counting mechanisms have been provided for photographic cameras and for film magazines so that a photographer can identify the number of the film sheet being exposed for a particular picture; and one of the features of the film magazine of the Wilson and Smith application referred to above is its counting mechanism. A press photographer is accustomed to keep a note-book record by number of the pictures he or she takes and to jot opposite each number the name or names of the person or persons or of the scene taken. A counting mechanism in itself is, however, not sufficient to insure that the photographer will associate each of a series of developed films in the correct order with his notations as to the pictures taken. He may note down that a particular number of exposures was of a particular person, group or scene, but without some film-identifying means which marks the films themselves as the pictures are taken, there can be no assurance that the developed and printed pictures will be associated correctly with the numbered notations of the pictures taken.

There have been many different proposals made heretofore for marking a film simultaneously with its exposure, but such film-identifying apparatus, as I am acquainted with, is not entirely satisfactory. In most cases the marking device must be positioned by hand and is inconvenient and bothersome to use and is therefore neglected. Such automatic marking mechanisms, as have been proposed, are complicated and expensive.

A primary object of the present invention is to provide apparatus for automatically marking a film, as it is exposed, with an identifying indicia so that after it is developed and printed, the picture can readily be identified.

Another object of the invention is to provide a film-identifying means for automatically marking a film as it is exposed, which will operate in time with a counting mechanism of the camera or magazine in which the film-identifying means is employed, thereby enabling the photographer to make proper identifying notations on his memorandum sheet of pictures taken.

2

Another object of the invention is to provide film-identifying means for automatically marking a film as it is exposed, which may be actuated from the same means as operates the counting mechanism of the camera or magazine.

Another object of the invention is to provide a novel film-identifying mechanism in which the identifying numbers of successive exposures are applied to the exposures, as they are made, by the light coming through the lens of the camera.

A still further object of the invention is to provide a film-identifying mechanism for marking film upon exposure which may be employed in a magazine constructed according to the Wilson and Smith application above-mentioned with but slight modification of the same.

Still other objects of the invention are to provide a film-identifying mechanism for marking film upon exposure which will be simple in construction and relatively inexpensive, and which will stay in order.

Other objects of the invention will be apparent hereinafter from the specification and from the recital of the appended claims.

In the drawings:

Fig. 1 is a fragmentary view looking at the back of a film magazine, constructed basically according to the Wilson and Smith application but equipped with a marking mechanism constructed according to the present invention, the magazine being broken away to reveal the counter mechanism, the means for indicating whether the film is uncovered or not, and the marking apparatus of the present invention;

Fig. 3 is a back view of the magazine on a reduced scale;

Fig. 4 is a longitudinal section through the magazine taken on the line 4—4 of Fig. 3 but on an enlarged scale and showing the magazine loaded and in closed position;

Fig. 5 is a longitudinal section. similar to Fig. 4, but showing the drawer of the magazine withdrawn to permit transfer of an exposed film sheet automatically to the back of the magazine; and Fig. 6 is a fragmentary view further illustrating the operation of the marking device.

While the mechanism of the invention may be applied to various types of cameras and to various types of film magazines, it has been illustrated in connection with a magazine such as disclosed in the Wilson and Smith application above-mentioned; and the structure of this magazine will be described sufficiently herein to permit an understanding of the present invention. For a more detailed description of the structure of the Wilson and Smith magazine, reference may be had to the Wilson and Smith application.

Figure 1:
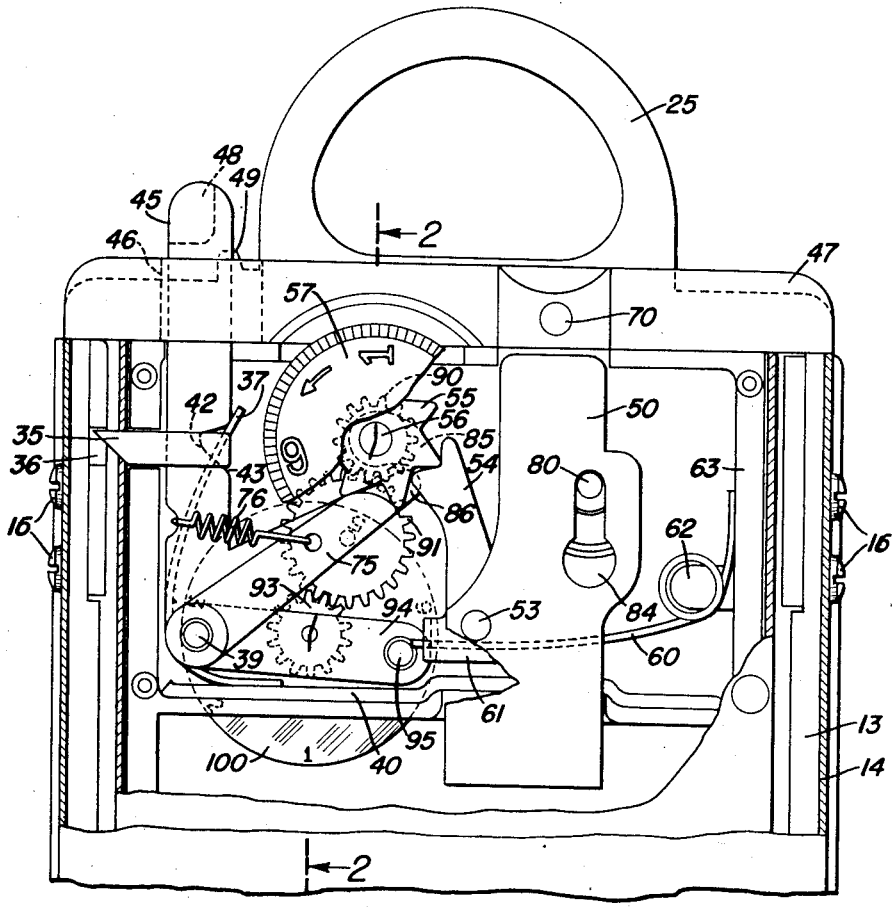

The magazine comprises a casing 10, a drawer 11, and a dark slide 12 (Figs. 4 and 5). The casing comprises a front part 13 and a rear part or sheet metal cover 14 which is secured to the part 13 by screws 16 (Fig. 1).

The drawer 11 is mounted to slide endwise within the casing. This drawer is adapted to hold a plurality of film sheaths or septums 15. In the instance shown, the drawer has a capacity of six film sheaths or septums 15, each sheath carrying a cut-film sheet.

The part 13 of the casing is provided on its front face with ribs 17 and with a groove 18 (Fig. 4). These are adapted to engage with cooperating grooves and ribs on the back of the camera on which the magazine is employed, to provide light-tight connection between the magazine and camera. There is an exposure opening 20 in the front wall of the casing; and the septums 15 are placed in the drawer 11 so that the film sheets carried thereby face this exposure opening. A ledge 21 is provided in the front wall of the casing around the exposure aperture; and it is against this ledge that each septum is seated for exposure.

The dark slide 12 is adapted to slide in and out of the drawer. It may be moved into and out of the drawer by a handle 25 which is riveted or otherwise secured to the dark slide. The rear face of the casing section 13 and the opposed face of the drawer 11 are provided with transversely extending pockets in which are mounted light valves 26 to prevent leakage of light along the dark slide into the magazine. When the dark slide is in closed position it rests at its rear end on a ledge 27 (Fig. 5) of the casing.

The septums 15 are adapted to be fed successively to the exposure opening 20, and after exposure, each septum is adapted to be fed to the rear of the drawer. There are a pair of leaf springs 30 (Figs. 4 and 5) riveted to the back plate 31 of the drawer 11. Only one of these springs is shown in the drawings. These springs which extend longitudinally of the magazine, are adapted to press upon the rearmost of the septums 15 to urge the septums forwardly in the drawer.

Fastened in the casing section 13 at opposite longitudinal sides of the exposure opening 20 are leaf springs 34. These springs, which extend longitudinally of the magazine, serve to return each septum, after exposure, to the back of the drawer.

The drawer is normally held against movement relative to the casing, being latched thereto by a catch 35 (Fig. 1) which is adapted to engage in a recess or notch 36 in one side of the drawer. The latch is constantly urged toward locking position by a torsion spring 37 which engages at one end in a recess of the latch, is coiled about a pivot pin 39, and rests at its opposite end against the transverse partition wall 40 of the drawer. The pivot pin 39 is riveted or otherwise secured in the drawer.

The catch 35 is formed with a lug 42 on its front face that engages in a notch 43 of a lever 45. This lever is a double-armed lever and is pivotally mounted upon the stud 39. One arm of this lever extends through a slot 46 in an end plate 47 which closes one end wall of the drawer. The projecting arm of the lever has a rounded boss 48 (Figs. 1 and 3) formed on the front side of it adjacent its outer end. This boss is adapted to engage over a lug 49 which is provided on the handle 25 of the dark slide 12. When the lever 45 is rocked to the right from the position shown in Fig. 1, the latch 35 is disengaged from the slot 36, unlocking the drawer, and simultaneously the boss 48 is engaged over the boss 49 so that the drawer is locked to the dark slide and both can be pulled out of the casing by pulling on the handle 25 of the dark slide.

Reciprocably mounted in the drawer is a slide 50 (Figs. 1, 4 and 5) which has a downturned inner end 51. Pivotally mounted upon this slide by means of the pin 53 is a pawl 54. This pawl is adapted to engage a ratchet wheel 55. This ratchet wheel is journaled on a stud 56 (Fig. 2) that is secured in the bottom of the drawer. A graduated dial or counter 57 is integral with the star wheel. This dial may bear graduations from 1 to 6 corresponding to the number of film sheets carried in the magazine, and between the numerals 1 and 6 the dial may have an arrow or other designating mark, as shown in Fig. 1 to indicate the direction in which the dial should be rotated for resetting it. The counter dial is visible through an opening or aperture 58 (Fig. 3) in the back 14 of the casing. This opening is large enough only for one of the indicia of the dial 57 to be exposed and visible at a time. Thus the number of the film in foremost position in the magazine at any time can be read from the counter dial.

A stop dog 75, that is pivotally mounted on the stud 39 serves to prevent accidental rotation of the star wheel 55 in a clockwise direction. This dog is held in operative engagement with the star wheel by a coil spring 76 which is secured at one end to the dog and which is fastened at its opposite end in a recess of the lever 45.

The slide 50 is constantly urged inwardly of the drawer by a torsion spring 60 which is engaged at one end in a kerf of the tail portion 61 of the pawl 54, is wound around a lug 62, that is formed on one side of the drawer, and engages at its other end against this side 63 of the drawer. Inward retracting movement of the slide 50 is limited by a stop pin 80. This pin is part of a cylindrical plunger 81 that is mounted in a recess in the drawer and is constantly urged rearwardly by a coil spring 82. The plunger passes through a bayonet slot 84 in the slide 50.

The plate 47 is provided on its rear side with a colored dot 70. When the slide 50 is in its forward position it covers this dot, indicating that the film sheet in the foremost septum is covered by the dark slide. When the slide 50 is in its inner, retracted position, the dot 70 is uncovered, indicating that this film sheet is uncovered, ready for exposure.

Figure 2:
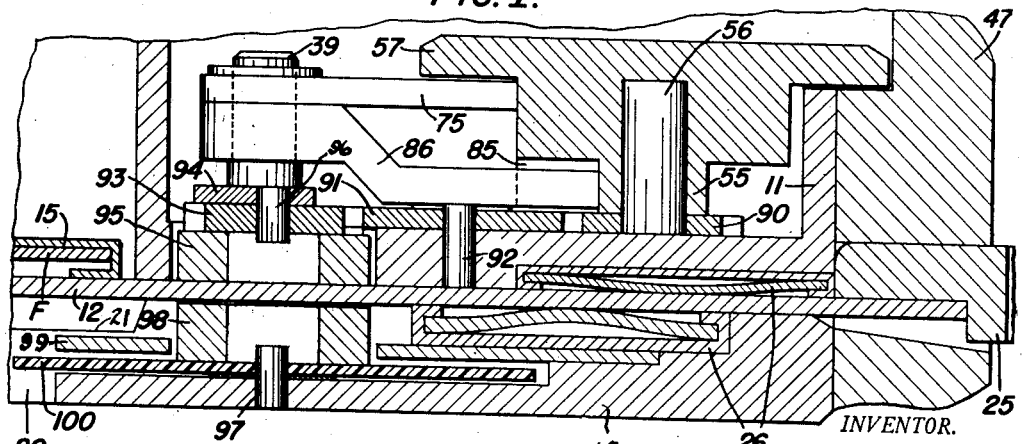
Fig. 2 is a greatly enlarged section on the yine 2—2 of Fig. 1, looking in the direction of the arrows.

The structure so far described is like that disclosed in the Wilson and Smith application. The new mechanism incorporated by the present invention will now be described. Secured to the star wheel 55 to rotate therewith is a spur pinion 90 (Fig. 2). This pinion meshes with a spur gear 91 that is journaled on a stud 92 which is secured in the drawer. The gear 91 meshes with a spur pinion 93. This pinion is journaled on a stud 96 which is secured in a plate 94 that is fastened to the drawer at opposite ends by means of pins 95 and 39. Pinion 93 has a permanent magnet 95 secured to it. This lies at one side of the dark slide 12 when the dark slide is in operative position. Mounted on a stud 97 in the casing at the opposite side of the dark slide is a transparent disc 100 which may be made of plastic or any other suitable material. Secured to this disc 100 is a second permanent magnet 98.

The disc 100 is graduated with numerals corresponding to the numerals of the counter 57. It extends under a plate 99, that is secured in the casing part 13 in front of ledge 21; and it projects far enough over the exposure opening 20 in front of said plate 99 for one of its numerals to overlie the septum 15 which is at the exposure opening, seated against ledge 21. Hence, when the camera is tripped with a septum in position for exposure, the light from the lens, will simultaneously expose the film and pass through the transparent disc 100. Thus, simultaneously with the making of a picture on the film sheet which is in the septum at the exposure opening, the numeral of the disc 100 which is then in registering position will be photographed on this film sheet. Because the disc 100 is indexed through the train of gearing 90—91—93 a step each time the counter 57 is indexed by pawl 54 and ratchet wheel 55, the number on dial 100 which overlies the septum 15 will always correspond to the numeral shown on the counter 57 so that by making a notation of the numeral, which is shown on the counter, the photographer can be sure that the negative which is correspondingly photographically marked, will be the one which corresponds to that number of picture on his list.

The operation of the magazine and its identifying mechanism will be understood from the preceding description but may be briefly summed up here. After the magazine has been loaded and put in the camera, and the counter 57 adjusted to the number 1 position which automatically adjusts dial 100 to the number 1 position, also, through operation of the gearing 90—91—93 and magnets 95, 98, the photographer can position a sheet of film at the exposure aperture 20 by withdrawing the dark slide 12. This permits the springs 30 (Figs. 4 and 5) to advance the stack of septums 15, moving the foremost septum to the exposure aperture and seating it against ledge 21. This also permits the spring 60 to retract and cock the slide 50 as shown in Fig. 5. The retracted slide uncovers the dot 70 indicating that a film is in position for exposure. The dark slide is now pushed back into the magazine behind the foremost septum to hold this septum against ledge 21 at the exposure aperture and to cover the other septums.

The camera may then be tripped to expose the film sheet in the foremost septum and to photograph on this film sheet the numeral of disc 100 which is then in registry with the exposure aperture. Then the lever 45 is pressed clockwise (Fig. 1) about its pivot stud 39 to disengage catch 35, thereby unlocking the drawer 11, and to simultaneously engage lug 45 over lug 49, thereby connecting the drawer 11 to the dark slide 12. By pulling on handle 25, drawer and dark slide are withdrawn together from the casing as shown in Fig. 5. This permits the springs 34 to move the septum, which carries the film sheet that has just been exposed, to the back of the casing, the septum rocking in this movement on stop bar 105 (Figs. 4 and 5) which is secured by screws 106 to the portion 14 of the casing.

The drawer 11 is then pushed back into the casing. The septum carrying the film sheet, which has been exposed, drops onto the stack of septums in the drawer as the drawer is closed. During the last part of closing movement of the drawer this now-rearmost septum of the stack engages the tail 51 of slide 50, as shown in Fig. 4, forcing the slide outwardly to cover dot 70 and to cause pawl 54 to advance ratchet wheel 55 a step.

The covered spot 70 indicates that there is no film at the exposure aperture. The advance of the ratchet wheel 55 advances counter dial 57 a step to show that a new film sheet is now at the front of the stack in the magazine; and the advance of the ratchet wheel 55 simultaneously advances disc 100 a step to bring opposite the exposure aperture the numeral of dial 100 which corresponds to the numeral of counter 57 which is now visible through opening 58. The photographer therefore knows that when he takes the next picture he will photograph on the negative a numeral corresponding to the numeral of the counter 57 which can be seen through the opening 58.

Upon withdrawal of dark slide 12 the now-foremost septum will be advanced to the exposure aperture. The dark slide is returned; and the picture may be taken with the identifying numeral photographed on the film. By making note of the numeral on the counter and the name of the person or place photographed when the film is exposed, then, the photographer can be sure of proper identification of the film when it is developed. The operation of moving the septum carrying the newly-exposed film to the rear of the stack will proceed as before described. Each time the drawer is opened and closed the counter 57 and dial 100 are advanced as before described.

As in the Wilson and Smith magazine, the star wheel 55 may have a cam 85 (Figs. 1 and 2) integral with it, which is therefore advanced step-by-step with the star wheel. When the last film in a stack of septums has been exposed and returned to the back of the stack, the cam will have advanced far enough to engage the tail 86 of double-armed lever 45 to rock this lever clockwise, disengage catch 35 and lock drawer 11 through lugs 48 and 49 to dark slide 12. Thus, double exposure of any film will be prevented. The stack of septums may now be removed from the magazine and a new stack placed therein.

The use of the two magnets 95 and 98 permits the dial 100 to be advanced simultaneously and in unison with counter 57 without any complicated drive between the dial and counter. The dial 100 can be driven by ratchet wheel 55 despite the intervention between ratchet wheel and dial of the dark slide. The identification marking mechanism is therefor simple and compact.

While the body of the disc 100 is preferably made transparent and the numerals thereon made opaque, obviously, the disc might be made opaque and the numerals made transparent. The disc might even be opaque with the numerals cut completely through it so that light will pass through the numerals. The expressions "transparent member with indicia thereon" and "transparent disc with indicia thereon," as used in the claims, therefore, are intended to include all these possible constructions.

While the invention has been described in connection with use as part of a magazine of a particular structure it will be understood that it may be used in magazines of other basic construction. Moreover, the dial 100 might be mounted in the camera as a permanent part thereof. Furthermore, the invention might be employed in a camera in which the film magazine is a permanent part of the camera and is not removable.

While the invention has been described, then, in connection with a particular embodiment thereof, it will be understood that it is capable of various modifications, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In photographic camera apparatus having an exposure aperture, the combination with means for moving photosensitive material to said exposure aperture for successive exposures, of a movable graduated counter disposed to have its successive graduations visible successively as it is actuated, a marking member movable step-by-step to mark successive exposures with different indicia, means for advancing said counter step-by-step upon successive exposures of the photosensitive material, and means driven in time with the counter advancing means for moving said marking member step-by-step comprising a movable magnet connected to said counter advancing means and a second movable magnet mounted in operative relation with the first magnet to be moved upon movement of the first magnet and connected to the marking member.

2. In photographic camera apparatus having an exposure aperture, the combination with means for moving photosensitive material to said exposure aperture for successive exposures, of a marking member movable step-by-step to mark successive exposures with different indicia, and means for imparting said step-by-step movement to said marking member upon successive exposures of the photosensitive material comprising a movable magnet, means for moving said magnet step-by-step upon successive exposures of the photosensitive material, and a second movable magnet connected to the marking member and mounted in operative relation with the first magnet to be moved upon movement of the first magnet.

3. In photographic camera apparatus having an exposure aperture, the combination with means for moving the photosensitive material to said exposure aperture for successive exposures, of a rotatable transparent marking disc having different indicia arranged circularly thereon about its axis, said disc being mounted so that on rotation its different indicia are disposed successively in front of the photosensitive material between the camera objective and the material, and means for rotating said disc step-by-step upon successive exposures of the photosensitive material comprising a movable magnet, means for moving said magnet step-by-step upon successive exposures of the photosensitive material, and a second movable magnet connected to said disc and mounted in operative relation with the first magnet to be moved upon movement of the first magnet.

4. In photographic camera apparatus having an exposure aperture, the combination with means for moving photosensitive material to said exposure aperture for successive exposures, of a rotary, graduated counter disposed to have its graduations visible successively exteriorly of said apparatus as it is rotated, a rotatable transparent marking disc having different indicia arranged thereon circularly about its axis, said disc being mounted so that on rotation its different indicia are disposed successively in front of the photosensitive material between the camera objective and the material, means for advancing the counter step-by-step with successive exposures of the photosensitive material, and means for rotating said disc step-by-step in time with the step-by-step rotation of said counter comprising a magnet connected to the counter, and a second magnet connected to the disc and mounted in operative relation to the first magnet to be moved upon movement of the first magnet.

5. In a film magazine, a casing having an exposure aperture therein at the front thereof, a drawer slidable into and out of the casing and adapted to hold a stack of septums, each of which carries a sheet of sensitized material, said drawer having an aperture therein at its front large enough to permit feed of the septums therethrough successively to said exposure aperture, a dark slide slidable into and out of said drawer in the space between the two apertures, means for effecting feed of the foremost septum in the stack through said drawer aperture to said exposure aperture when the dark slide is withdrawn, means operable, when both the dark slide and the drawer are withdrawn, for moving the septum, which is at the exposure aperture, to the rear of the casing, a transparent marking member having different indicia thereon, said marking member being movably mounted in said casing in such position that on step-by-step movement of said marking member its different indicia are advanced successively in front of the photosensitive material, and means for advancing said marking member step-by-step comprising a magnet disposed at the rear of said space in which the dark slide is slidable, a second magnet disposed at the front of said space and connected to the marking member and positioned in operative relation to the first magnet to be moved upon movement of the first magnet, and a reciprocable member positioned to be engaged by the last septum in the stack, when all the septums are in the drawer behind the dark slide, and to be moved thereby in one direction to move said first magnet a step.

6. In a film magazine, a casing having an exposure aperture therein at the front thereof, a drawer slidable into and out of the casing and adapted to hold a stack of septums, each of which carries a sheet of sensitized material, said drawer having an aperture therein at its front large enough to permit feed of the septums therethrough successively to said exposure aperture, a dark slide slidable into and out of said drawer in the space between the two apertures, means for effecting feed of the foremost septum in the stack through said drawer aperture to said exposure aperture when the dark slide is withdrawn, means operable, when both the dark slide and the drawer are withdrawn, for moving the septum, which is at the exposure aperture, to the rear of the casing, a marking member movable step-by-step to apply different indicia successively to the successive film sheets when each film sheet is foremost in the stack, and means for advancing said marking member step-by-step comprising a magnet disposed at the rear of the space in which the dark slide is slidable, a second magnet disposed at the front of said space and connected to the marking member and positioned in operative relation to the first magnet to be moved upon movement of the first magnet, and a reciprocable member positioned to be engaged by the last septum in the stack, when all the septums are in the drawer behind the dark slide, and to be moved thereby in one direction to move said first magnet a step.

7. In a film magazine, a casing having an exposure aperture therein at the front thereof, a drawer slidable into and out of the casing and adapted to hold a stack of septums, each of which carries a sheet of sensitized material, said drawer having an aperture therein at its front large enough to permit feed of the septums therethrough successively to said exposure aperture, a dark slide slidable into and out of said drawer in the space between the two apertures, means for effecting feed of the foremost septum in the stack through said drawer aperture to said exposure aperture when the dark slide is withdrawn, means operable, when both the dark slide and the drawer are withdrawn, for moving the septum, which is at the exposure aperture, to the rear of the casing, a transparent marking disc having different indicia thereon disposed circularly about its axis, said marking member being rotatably mounted in said casing in such position that on step-by-step rotation thereof its different indicia are moved successively in front of the photosensitive material, and means for advancing said disc step-by-step comprising a rotary magnet disposed at the rear of the space in which the dark slide is slidable, a second magnet disposed at the front of said space and connected to the marking disc and positioned in operative relation to the first magnet to be moved upon movement of the first magnet, and a reciprocable member positioned to be engaged by the last septum in the stack, when all the septums are in the drawer behind the dark slide, and to be moved thereby in one direction to move said first magnet a step.

8. A film magazine comprising a casing having an exposure aperture therein, a drawer slidable into and out of said casing and adapted to hold a plurality of film-carrying septums in a stack, said drawer having an aperture therein through which the septums may be fed to the exposure aperture, a dark slide slidable into and out of the casing in the space between said apertures, means for feeding a septum to the exposure aperture each time the dark slide is withdrawn, means for moving the septum, which is at the exposure aperture, to the back of the stack when the drawer is opened and closed, a graduated counter mounted in said drawer to have its numerals visible successively as it is advanced, a transparent, movable marking member having different indicia thereon, said marking member being mounted in the casing so that one of its indicia overlies the foremost septum in the stack, means actuated upon opening and closing the drawer for advancing the counter a step, and means for advancing said marking member a step on advance of the counter a step comprising a magnet connected to the counter and disposed at the rear of the space in which the dark slide is slidable, and a second magnet connected to the marking member and positioned in front of said space in operative relation to the first magnet to be moved upon movement of the first magnet.

9. A film magazine comprising a casing having an exposure aperture therein, a drawer slidable into and out of said casing and adapted to hold a plurality of film-carrying septums in a stack, said drawer having an aperture therein through which the septums may be fed to the exposure aperture, a dark slide slidable into and out of the casing in the space between said apertures, means for feeding a septum to the exposure aperture each time the dark slide is withdrawn, means for moving the septum, which is at the exposure aperture, to the back of the stack when the drawer is opened and closed, a graduated counter mounted in said drawer to have its numerals visible successively as it is advanced, a rotatable transparent marking disc having different indicia thereon arranged circularly about its axis; said marking member being mounted in the casing so that one of its indicia overlies the foremost septum in the stack, means actuated upon opening and closing the drawer for advancing the counter a step, and means for advancing said disc a step on advance of the counter a step comprising a magnet connected to the counter and disposed at the rear of the space in which the dark slide is slidable, and a second magnet connected to the marking member and positioned in front of said space in operative relation to the first magnet to be moved upon movement of the first magnet.

10. A film magazine comprising a casing having an exposure aperture therein, a drawer slidable into and out of said casing and adapted to hold a plurality of film-carrying septums in a stack, said drawer having an aperture therein through which the plates may be fed to the exposure aperture, a dark slide slidable into and out of the casing in the space between said apertures, means for feeding a septum to the exposure aperture each time the dark slide is withdrawn, means for moving the septum, which is at the exposure aperture, to the back of the stack when the drawer is opened and closed, a graduated counter journaled in the drawer and adapted to be rotated step-by-step to render its graduations successively visible, a ratchet wheel secured to said counter, a slide reciprocable in the drawer, a pawl carried by said last-named slide and engaging said ratchet wheel, a member connected to said last-named slide adapted to engage the rearmost septum in the stack to move said last-named slide in a direction to cause the pawl to advance the ratchet wheel, when the drawer is closed after return of a septum to the back of the stack, means constantly urging the slide in the opposite direction, a transparent graduated dial having graduations thereon corresponding to the graduations of said counter, said dial being rotatably mounted in the casing so that a graduation thereof projects in front of the foremost septum, and means for rotating said septum step-by-step with step-by-step rotation of the ratchet wheel comprising a rotary magnet connected to the ratchet wheel and disposed at the rear of the space in which the dark slide slides, and a second rotary magnet disposed in front of said space and connected to said dial and positioned in operative relation to the first magnet to be rotated a step upon rotation of the first magnet a step.

11. In apparatus for a photographic camera having an exposure aperture, the combination with means for moving sensitized material to said exposure aperture for exposure of said material and for moving said material away from the exposure aperture after exposure thereof, and a shield movable in and out of operative position with reference to said exposure aperture and adapted, when in operative position, to prevent exposure of sensitized material, of means for marking successive exposures with different indicia comprising a transparent marking member positioned at one side of said exposure aperture so that one of its indicia projects in front of the sensitized material which is at the exposure aperture, and means for advancing said marking member step-by-step to bring its indicia successively into projecting position, comprising a magnet disposed at the rear of the space in which said shield moves, means for advancing said magnet step-by-step with each cycle of moving sensitized material to and from said exposure aperture, and a second magnet disposed in front of said space and connected to said marking member and positioned in operative relation to the first magnet to be advanced a step upon movement of the first magnet a step.

12. In apparatus for a photographic camera having an exposure aperture, the combination with means for moving sensitized material to said exposure aperture for exposure of said material and for moving said material away from the exposure aperture after exposure thereof, and a shield movable in and out of operative position with reference to said exposure aperture and adapted, when in operative position, to prevent exposure of sensitized material, of means for marking successive exposures with different indicia comprising a graduated, transparent, rotary marking member positioned at one side of said exposure aperture so that one of its graduations projects in front of the sensitized material which is at the exposure aperture, and means for rotating said marking member step-by-step to bring its indicia successively into projecting position, comprising a rotary magnet disposed at the rear of the space in which said shield moves, means for rotating said magnet step-by-step with each cycle of moving sensitized material to and from said exposure aperture, and a second rotary magnet disposed in front of said space and connected to said marking member and positioned in operative relation to the first magnet to be rotated a step upon movement of the first magnet a step, and a graduated counter connected to one of said magnets to move therewith and having graduations corresponding to those of said marking member, said counter being mounted to be visible exteriorly of said apparatus to indicate exteriorly which graduation of the marking member is in projecting position.

13. Apparatus for a photographic camera, comprising a magazine adapted to hold a plurality of sheets of sensitized material and having an exposure aperture at its front, a dark slide slidable in and out of said magazine in a space behind said exposure aperture, means for feeding a sensitized sheet to said exposure aperture when said dark slide is withdrawn, means for moving the sheet, which is at the exposure aperture away from the exposure aperture after exposure thereof, a transparent marking member having a plurality of diffierent indicia thereon, said marking member being mounted at one side of said exposure aperture so that one of its indicia projects in front of a sensitized sheet when the sheet is at the exposure aperture, and means for advancing said marking member step-by-step to bring its different indicia successively into projecting position, comprising a magnet disposed at the rear of the space in which the dark slide slides, means for advancing said magnet step-by-step with each cycle of feeding a sensitized sheet to the exposure opening and of moving said sheet therefrom, and a second magnet disposed in front of said space and connected to said marking member and positioned in operative relation to the first magnet to be advanced a step upon movement of the first magnet a step.

14. Apparatus for a photographic camera comprising a magazine adapted to hold a plurality of sheets of sensitized material and having an exposure aperture at its front, a dark slide slidable in and out of said magazine in a space behind said exposure aperture, means for feeding a sensitized sheet to said exposure aperture when said dark slide is withdrawn, means for moving the sheet, which is at the exposure aperture away from the exposure aperture after exposure thereof, a transparent rotary marking member having a plurality of different indicia thereon, said marking member being mounted at one side of said exposure aperture so that one of its indicia may project in front of a sensitized sheet when the sheet is at the exposure aperture, and means for rotating said marking member step-by-step to bring its indicia successively into projecting position, comprising a ratchet wheel, a pawl engaging said ratchet wheel, means for moving said pawl to advance the ratchet wheel a step with each cycle of feeding a sensitized sheet to the exposure opening and moving said sheet therefrom, a rotary magnet secured to said ratchet wheel and disposed at the rear of the space in which said dark slide slides, and a second rotary magnet disposed in front of said space and connected to said marking member and positioned in operative relation to said first magnet to be rotated a step upon rotation of the first magnet a step.

15. Apparatus for a photographic camera comprising a magazine adapted to hold a plurality of sheets of sensitized material and having an exposure aperture at its front, a dark slide slidable in and out of said magazine in a space behind said exposure aperture, means for feeding a sensitized sheet to said exposure aperture when said dark slide is withdrawn, means for moving the sheet, which is at the exposure aperture away from the exposure aperture after exposure thereof, a graduated transparent rotary marking member, said marking member being mounted at one side of said exposure aperture so that one of its graduations may project in front of a sensitized sheet when the sheet is at the exposure aperture, and means for rotating said marking member step-by-step, to bring its graduations successively into projecting position, comprising a ratchet wheel, a pawl engaging said ratchet wheel, means for moving said pawl to advance the ratchet wheel a step with each cycle of feeding a sensitized sheet to the exposure opening and moving said sheet therefrom, a rotary magnet secured to said ratchet wheel and disposed at the rear of the space in which said dark slide slides, and a second rotary magnet disposed in front of said space and connected to said marking member and positioned in operative relation to said first magnet to be rotated a step upon rotation of said first magnet a step, and a graduated rotary counter connected to said ratchet wheel to rotate therewith and mounted in said apparatus to be visible exteriorly thereof, the graduations of said counter corresponding to the graduations of said marking member so as to indicate exteriorly of said apparatus the position of said marking member.

OSCAR STEINER.

REFERENCES CITED

The following references are of record in the file of this patent:

UNITED STATES PATENTS

| Number | Name | Date |
| --- | --- | --- |
| 518,372 | Mackenstein | Apr. 17, 1894 |
| 2,188,843 | Pappajion | Jan. 30, 1940 |
| 2,483,578 | Gallistel | Oct. 4, 1949 |